(12) United States Patent
Hansen et al.

(10) Patent No.: US 9,480,138 B2
(45) Date of Patent: Oct. 25, 2016

(54) ARTICULATING THERMAL PROCESSING TORCHES AND RELATED SYSTEMS AND METHODS

(71) Applicant: Hypertherm, Inc., Hanover, NH (US)

(72) Inventors: Brett Andrew Hansen, Mapleton, UT (US); Peter J. Twarog, West Lebanon, NH (US)

(73) Assignee: Hypertherm, Inc., Hanover, NH (US)

( * ) Notice: Subject to any disclaimer, the term of this patent is extended or adjusted under 35 U.S.C. 154(b) by 376 days.

(21) Appl. No.: 14/104,645

(22) Filed: Dec. 12, 2013

(65) Prior Publication Data

US 2014/0138360 A1    May 22, 2014

Related U.S. Application Data

(63) Continuation-in-part of application No. 12/186,974, filed on Aug. 6, 2008, now Pat. No. 8,614,404.

(60) Provisional application No. 60/963,586, filed on Aug. 6, 2007.

(51) Int. Cl.
| | |
|---|---|
| *B23K 10/00* | (2006.01) |
| *H05H 1/34* | (2006.01) |
| *B23K 9/32* | (2006.01) |

(52) U.S. Cl.
CPC ............... *H05H 1/34* (2013.01); *B23K 9/323* (2013.01); *H05H 2001/3478* (2013.01)

(58) Field of Classification Search
CPC .. H05H 1/34; H05H 2001/3478; H05H 1/26; B23K 9/323

USPC ............ 219/121.39, 121.45, 121.48, 121.56, 219/124.4, 137 R
See application file for complete search history.

(56) References Cited

U.S. PATENT DOCUMENTS

| | | | | |
|---|---|---|---|---|
| 2,492,526 A | * | 12/1949 | Geibig | ................... B23K 7/001 239/273 |
| 2,743,346 A | | 4/1956 | Scholl | |
| 2,986,624 A | | 5/1961 | Marta | |

(Continued)

FOREIGN PATENT DOCUMENTS

| | | |
|---|---|---|
| EP | 0529850 | 3/1993 |
| EP | 1061782 | 12/2000 |

(Continued)

OTHER PUBLICATIONS

International Search Report for International Application No. PCT/US2008/072314, Date of Mailing Feb. 16, 2009, including Written Opinion of the International Searching Authority (13 pages total).

*Primary Examiner* — Mark Paschall
(74) *Attorney, Agent, or Firm* — Proskauer Rose LLP

(57) ABSTRACT

In some aspects, a plasma processing torch can include an end portion that receives at least one gas and at least one power input; a first joint coupled to the end portion, the first joint conveying the gas and power through the first joint; a middle portion coupled to the first joint, the middle portion conveying the gas and power through the middle portion; a second joint coupled to the middle portion at an end opposite the first joint, the pivot joint conveying the gas and power through the pivot joint; and a head portion coupled to the second joint, the head portion conveying the gas and power to a torch tip to generate a plasma arc.

24 Claims, 16 Drawing Sheets

(56) References Cited

U.S. PATENT DOCUMENTS

| | | |
|---|---|---|
| 4,145,595 A | 3/1979 | Keller et al. |
| 4,268,740 A | 5/1981 | Sanders |
| 4,361,747 A | 11/1982 | Torrani |
| 4,778,155 A | 10/1988 | Suchevich et al. |
| 4,892,990 A | 1/1990 | Acheson |
| 4,902,871 A | 2/1990 | Sanders et al. |
| 5,132,513 A | 7/1992 | Ingwersen et al. |
| 5,208,442 A | 5/1993 | Ahola et al. |
| 5,338,917 A | 8/1994 | Stuart et al. |
| 5,473,131 A | 12/1995 | Sperling |
| 5,756,959 A | 5/1998 | Freeman et al. |
| 5,841,095 A | 11/1998 | Lu et al. |
| 5,916,465 A | 6/1999 | New et al. |
| 6,080,955 A | 6/2000 | Schwankhart |
| 6,084,199 A | 7/2000 | Lindsay et al. |
| 6,095,801 A | 8/2000 | Spiewak |
| 6,380,508 B1 | 4/2002 | Sorkin |
| 6,855,905 B2 | 2/2005 | Delgado et al. |
| 7,453,050 B2 | 11/2008 | Delgado |
| 7,665,996 B2 * | 2/2010 | Jaeger .................. H01R 35/04 439/13 |
| 8,134,097 B2 | 3/2012 | Schneider |
| 2003/0052095 A1 | 3/2003 | Sanders et al. |
| 2006/0037947 A1 | 2/2006 | Schneider |

FOREIGN PATENT DOCUMENTS

| | | |
|---|---|---|
| EP | 1631129 | 3/2006 |
| RU | 2041777 | 8/1995 |
| WO | 02/13583 | 2/2002 |

* cited by examiner

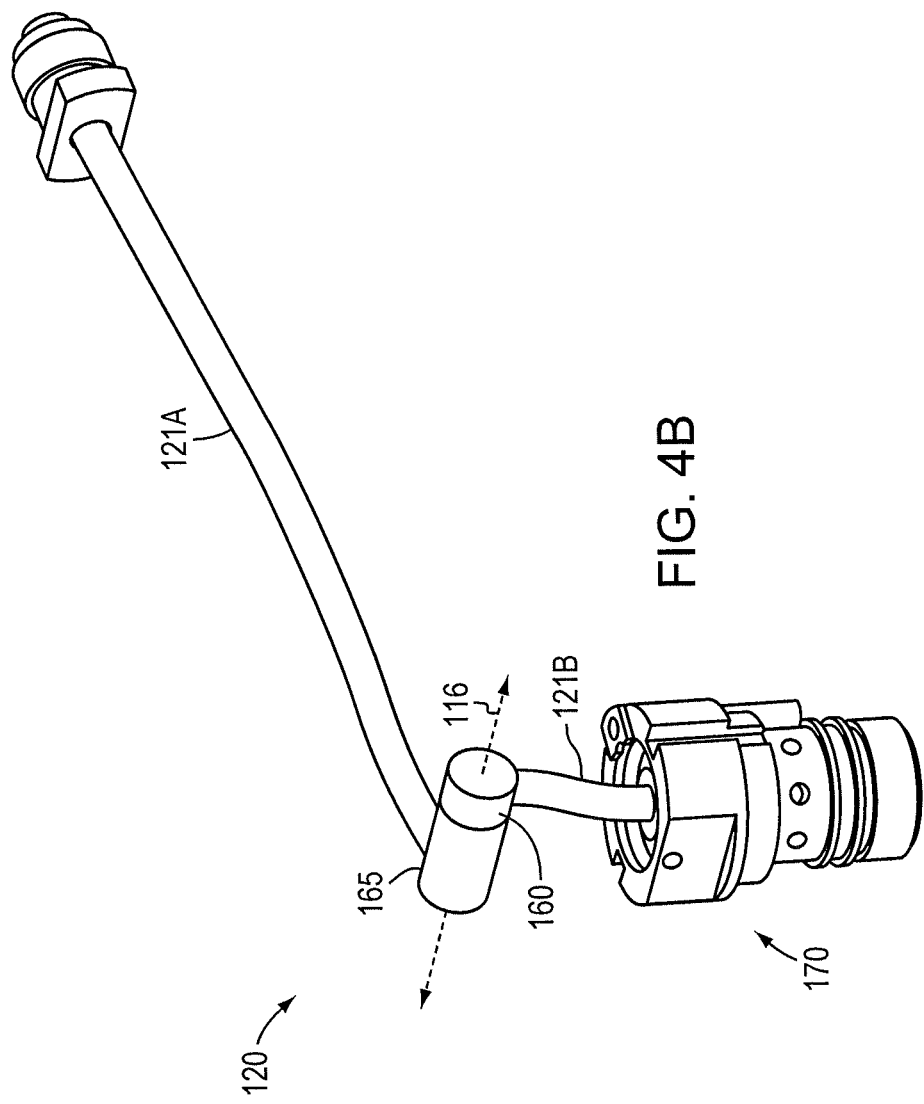

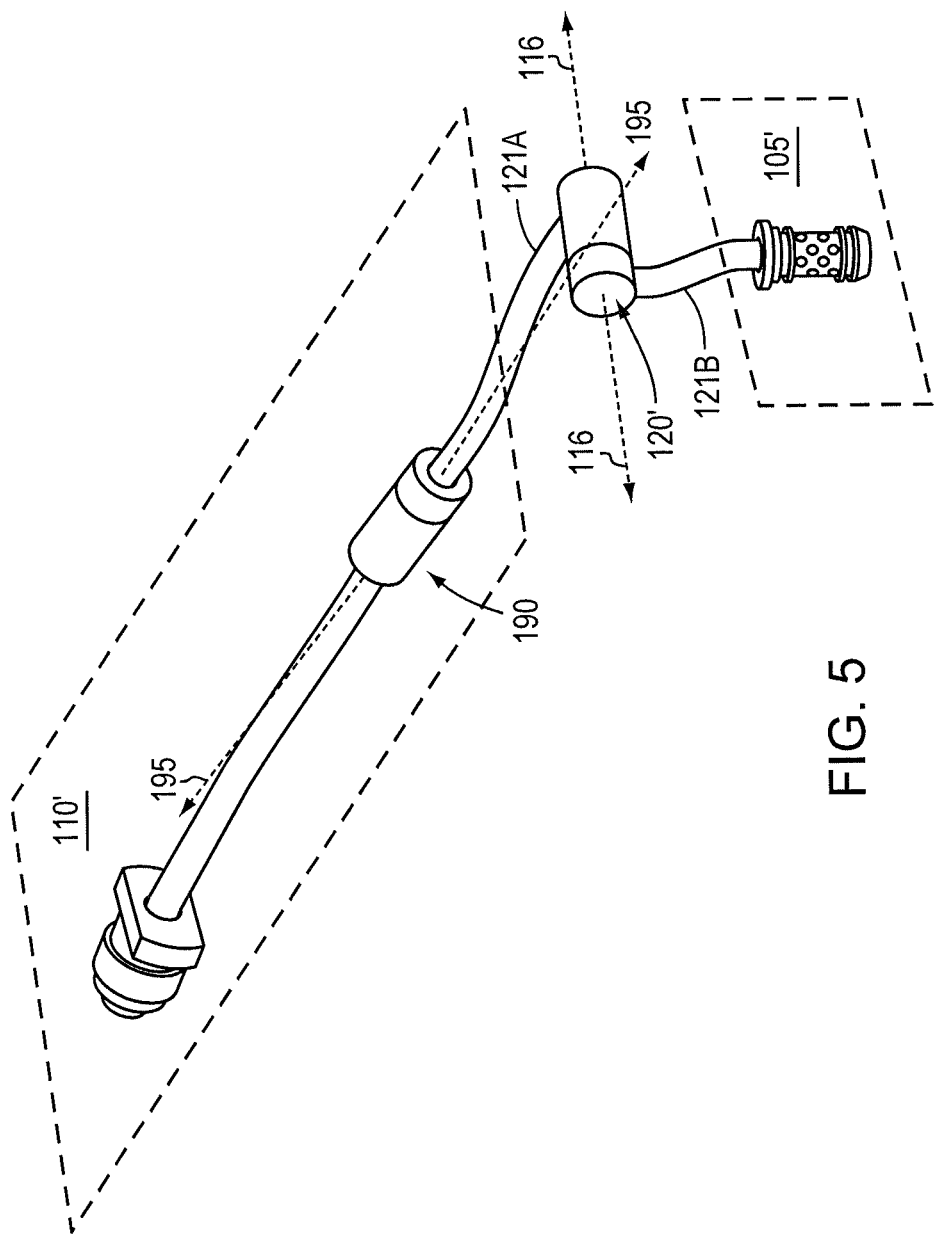

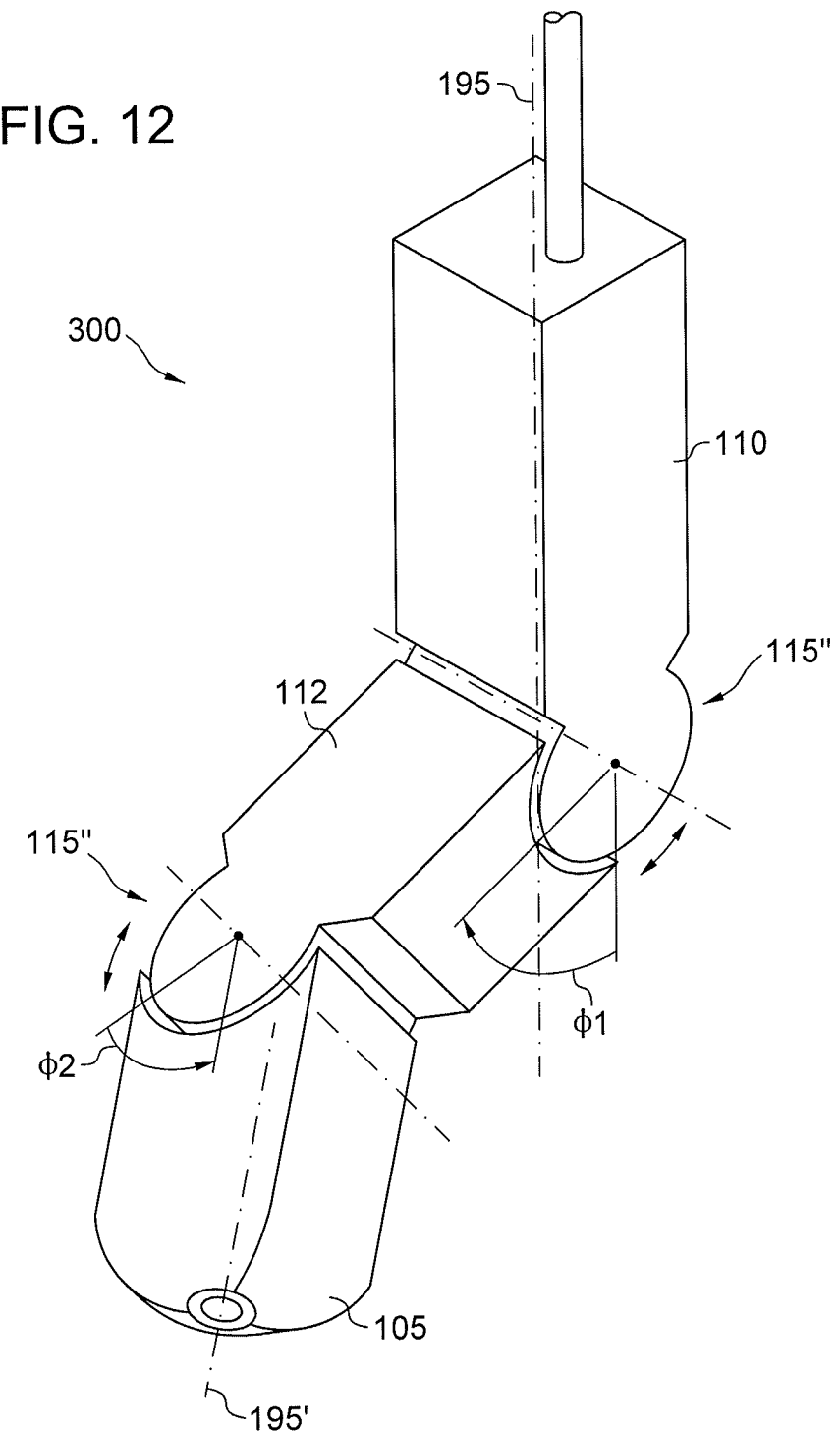

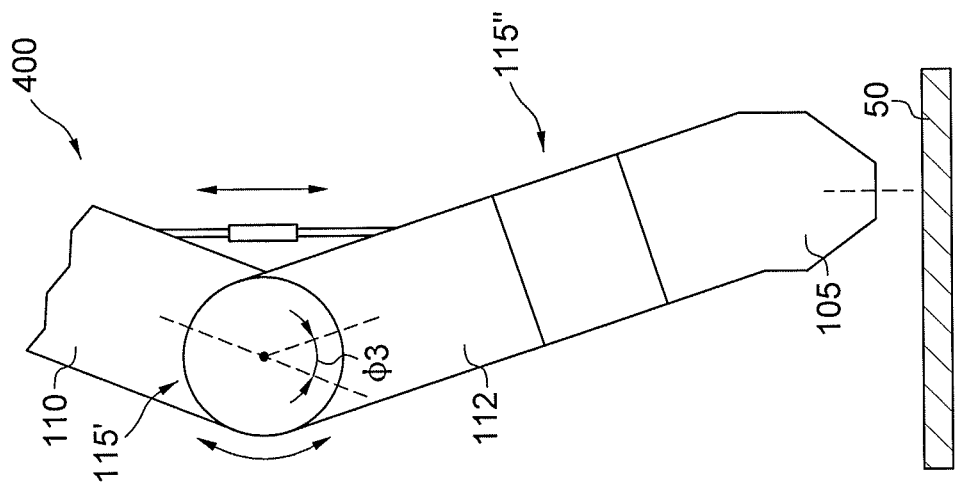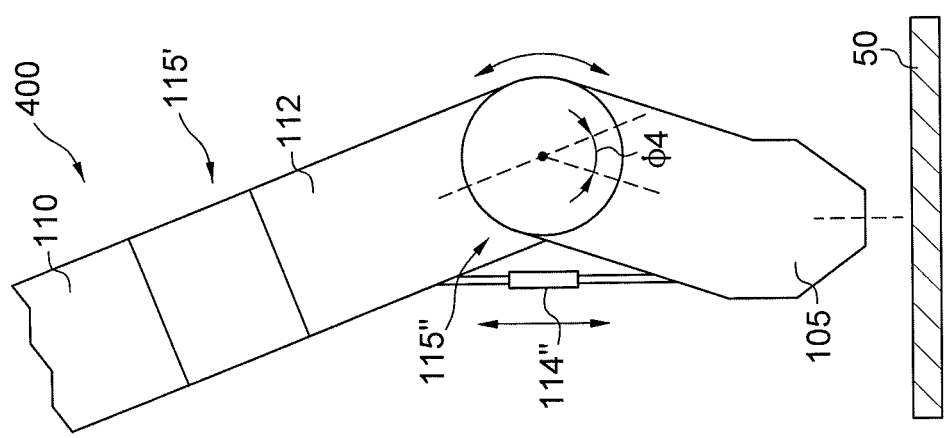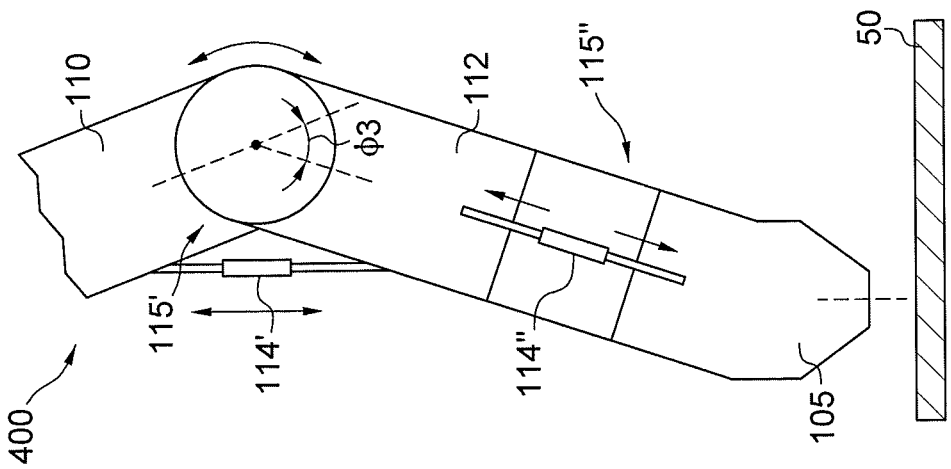

ARTICULATING THERMAL PROCESSING TORCHES AND RELATED SYSTEMS AND METHODS

CROSS-REFERENCE TO RELATED APPLICATIONS

This application is a continuation-in-part of U.S. Ser. No. 12/186,974 filed on Aug. 6, 2008 and titled "Articulated Thermal Processing Torch," which claims the benefit of and priority to U.S. Provisional Patent Application No. 60/963,586 filed on Aug. 6, 2007 and titled "Articulated Plasma ARC Torch," the contents of both of which are hereby incorporated herein by reference in their entirety.

TECHNICAL FIELD

This application relates generally to thermal processing devices, such as plasma arc torches. More specifically, this application relates to articulating thermal processing torches and related systems and methods.

BACKGROUND

Plasma arc torches are used in the cutting and marking of metallic materials. A plasma arc torch generally includes a torch body, an electrode mounted within the body, a nozzle with a central exit orifice, electrical connections, passages for cooling and arc control fluids, a swirl ring to control the fluid flow patterns, and a power supply. Gases used in the torch can be non-reactive (e.g., argon or nitrogen), or reactive (e.g., oxygen or air). The torch produces a plasma arc, which is a constricted ionized jet of a plasma gas with high temperature and high momentum.

Due to their versatility, plasma torches are finding uses in an increasing number of applications. Hand-held torches are now being used in ever more intricate situations, including those where access to portions of the workpiece can be difficult. Automated (mechanized) torches are being used to cut special shapes, including cuts having bevel surfaces. One way to make such cuts is to angle the torch head, such that the plasma arc emitted from the torch is not perpendicular with a planar workpiece that is being cut. Expensive and extensive automated systems have been devised to automatically rotate torches to perform bevel cuts.

Technical hurdles related to the articulated joint have thus far prevented such concepts from reaching the market. One issue preventing certain manufacturers from entering the articulated torch market has been the extensive use of torch designs with moving plungers inside the torch head. These "blowback" designs utilize flexible wires inside the torch handle, which constrain the torch design and make an articulated torch very difficult to implement into the design. See, e.g., U.S. Pat. No. 4,902,871 issued to Sanders et al. entitled "Apparatus and Process for Cooling a Plasma Arc Electrode". As mentioned above, performing a bevel cut using a mechanized plasma arc torch results in an expensive design requiring large motors to move the torch. The motors used to position the torch during the cut impose a mechanical stress on the leads of the torch, resulting in premature failure of the leads.

SUMMARY

In some aspects, a plasma processing torch can include a torch housing having a head portion pivotally coupled to a body portion; a first pivot joint located between the head portion the body portion; a first electrically conductive member conducting an electrical current across the first joint; a first interior gas passage to convey a processing gas across the first joint; a second pivot joint located between the head portion and the first joint; a second electrically conductive member conducting an electrical current across the second joint and a second interior gas passage to convey a processing gas across the second joint, wherein the first pivot joint is disposed at a non-zero angle from the second pivot joint about a longitudinal axis of the body portion.

Embodiments can include one or more of the following features.

In some embodiments, the first pivot joint has a first pivotal connector that comprises a first electrically conductive wall: i) conducting the electrical current between the body portion and the head portion; and ii) defining and surrounding at least a portion of the first interior passage fluidly to provide the processing gas between the body portion and the head portion.

In some embodiments, the first interior passage and the second interior passage together provide a shield gas or a plasma gas to the head portion.

In some embodiments, a pivoting axis of the first pivotal joint is disposed at the non-zero angle away from a pivoting axis of the second pivotal joint. For example, the non-zero angle can be about 70 degrees to about 90 degrees. In some cases, the non-zero angle is about 85 degrees to about 90 degrees.

In some embodiments, at least one of the pivotal joints is biased at an offset angle when the head portion is substantially perpendicular to a surface of a workpiece to be cut by the torch. In some cases, the offset angle can be relative to the longitudinal axis of the body portion.

In some embodiments, the first pivot joint contains a first pivotal connector that includes an electrically conductive male connector comprising a substantially cylindrical body; an electrically conductive female connector comprising a second substantially cylindrical body adapted to mate with the electrically conductive male connector; and a resilient electrical connector disposed between the substantially cylindrical body of the male connector and the second substantially cylindrical body of the female connector. For example, the resilient electrical connector comprises a Louvertac band electrical connector.

In some embodiments, a first actuator drives the first pivot joint and a second actuator drives the second pivot joint.

In some aspects, a plasma processing torch can include an end portion that receives at least one gas and at least one power input; a first joint coupled to the end portion, the first joint conveying the gas and power through the first joint; a middle portion coupled to the first joint, the middle portion conveying the gas and power through the middle portion; a second joint coupled to the middle portion at an end opposite the first joint, the pivot joint conveying the gas and power through the pivot joint; and a head portion coupled to the second joint, the head portion conveying the gas and power to a torch tip to generate a plasma arc.

Embodiments can include one or more of the following features.

In some embodiments, the first joint is one of a pivot joint or a rotational joint. In some embodiments, the first and second joints are pivot joints. In some embodiments, the first joint and the second joint are offset from one another relative to a longitudinal axis of the end portion. In some embodiments, the first joint and the second joint pivot along different planes.

In some embodiments, the end portion, middle portion, and head portion comprise rigid members.

In some embodiments, the plasma processing torch also includes a first actuator coupled between the end portion and the middle portion and a second actuator coupled between the middle portion and the head portion.

In some embodiments, at least one of the joints houses a pivotal connector that includes an electrically conductive wall: i) conducting the power between the end portion and the head portion; and ii) defining and surrounding an interior passage to provide the gas between the end portion and the head portion.

In some embodiments, at least one of the pivotal connectors is biased at an offset angle when the head portion is substantially perpendicular to a surface of a workpiece to be cut.

In some aspects, a method of forming a bevel cut along a substantially planar workpiece with a plasma arc torch, where the method includes forming a beveled edge of a workpiece by: pivoting a head portion of the torch about a first pivot axis by pivoting a first pivotal connector: i) conducting an electrical current between a body portion of the torch and the head portion; and ii) defining and surrounding at least a portion of a first interior passage to provide a processing gas between the body portion and the head portion; pivoting the head portion and the first pivot axis about a second pivot axis by pivoting a second pivotal connector defining a second interior passage in fluid communication with the first interior passage to provide the processing gas between the body portion and the head portion, the second pivot axis being disposed at a non-zero angle from the first pivot axis about a longitudinal axis of the body portion; and moving the head portion along the workpiece to form a peripheral edge of the bevel cut.

Embodiments can include one or more of the following features.

In some embodiments, the pivoting about the first pivot axis and the pivoting about the second pivot axis are performed simultaneously.

In some embodiments, the moving the head portion along the workpiece comprises translating the body portion and the head portion along the workpiece while the head portion is pivoted about the first and/or second pivot axes.

In some embodiments, the non-zero angle between the first pivot axis and the second pivot axis about the body portion longitudinal axis is about 70 degrees to about 90 degrees.

In some aspects, a thermal processing torch that can include a torch housing having a head portion pivotally coupled relative to a body portion with a joint portion can include a pivotal connector (e.g., an internal pivotal connector) that simultaneously pivots about a common axis with the joint portion of the torch housing. The pivotal connector can include an electrically conductive wall conducting an electrical current between the body portion of the torch housing and the head portion of the torch housing. The pivotal connector can also include a passage that can provide a processing gas between the body portion of the torch housing and the head portion of the torch housing.

In some aspects, a pivotal connector assembly for providing an electrical current and a gas flow between a head portion and a body portion of a torch can include a male connector and a mating female connector. The male connector can include a tubular portion that defines a first gas passage and an electrically conductive external wall portion. The mating female connector can include a second tubular portion that defines a second gas passage and includes a second electrically conductive external wall portion. The second gas passage can be in fluid communication with the gas passage of the male connector. The connector assembly can also include a gas seal disposed between the male and female connectors providing gas isolation between the first and second gas passages and a circumscribing radial spring element disposed within the female connector and between the first and second electrically conductive external wall portion. The circumscribing radial spring element can pass an electrical current of the torch.

In some aspects, a torch including a head portion pivotally attached to a body portion can include a torch housing that includes a pivotal joint. The torch can include a connector disposed in a spatial relationship with the pivotal joint. The connector can conduct an electrical current and provide a processing gas between the body portion and the head portion of the torch. The connector can be disposed in the torch housing and include a first electrically conductive gas tube and a second, mating electrically conductive gas tube rotationally disposed relative to the first electrically conductive gas tube. The connector can include a resilient electrical connector electrically coupling the first electrically conductive gas tube to the second electrically conductive gas tube.

In some aspects, an articulating thermal processing torch can include a body portion, a head portion and a pivotal joint providing fluid and electrical communication between the head portion and the body portion. The pivotal joint can enable the head portion to pivot relative to the body portion. The torch can include a rotational joint providing fluid and electrical communication through the body portion. The rotational joint can be configured to rotate the head portion and the pivotal joint about an axis of the body portion.

In some aspects, a method for creating a bevel cut with a torch can include pivoting a head portion of the torch relative to a torch body. The torch body can be rigidly affixed to a gantry. The method can also include rotating the pivoted head portion about a longitudinal axis of the torch body to position the torch head relative to a workpiece.

In some aspects, an articulating thermal processing torch that includes a torch body, a head portion and a motorized pivot joint mechanically coupled to at least one of the torch body or head portion to enable the head portion to pivot relative to the body. The torch can also include a motorized rotational joint mechanically coupled to at least one of the torch body or head portion to enable the head portion to rotate relative to at least a portion of the body for positioning the torch head relative to a workpiece.

In some aspects, a beveling torch system can include a torch body having a central longitudinal axis, a torch head connected to the body, at least one gas lead extending into the torch head and at least one electrical lead extending into the torch head. The system can also include a rotatable connector rotating the torch head independently of the at least one gas lead and the at least one electrical lead about the central longitudinal axis of the torch body. The system can include a pivotal connector pivoting the torch head about a second axis, the second axis disposed at an angle relative to the central longitudinal axis of the torch body. The pivotal connector can include an electrically conductive wall conducting an electrical current and a passage providing a processing gas.

In other examples, any of the aspects above, or any apparatus or method described herein, can include one or more of the following features.

In some embodiments, a pivotal connector includes an electrically conductive male connector that includes a substantially cylindrical body and an electrically conductive female connector that includes a second substantially cylindrical body adapted to mate with the electrically conductive male connector. The pivotal connector can include a Louvertac electrical connector disposed between the substantially cylindrical body of the male connector and the second substantially cylindrical body of the female connector.

In some embodiments, the electrically conductive wall of the connector (e.g., internal connector or pivotal connector) defines the passage that provides the processing gas between the body portion of the torch housing and the head portion of the torch housing.

In some embodiments, a torch can include a second pivotal connector (e.g., second internal pivotal connector) disposed relative to a pivotal connector (e.g., a first pivotal connector). The second pivotal connector can include a second electrically conductive wall conducting a second electrical current between the body portion of the torch housing and the head portion of the torch housing. The second pivotal connector can include a second passage that provides a second processing gas between the body portion of the torch housing and the head portion of the torch housing. In some embodiments, the second electrically conductive wall defines the second passage providing a second processing gas.

In some embodiments, a pivotal connector can conduct a pilot current or a cutting current. A second pivotal connector can conduct a pilot current or a cutting current. In some embodiments, a torch can include a pilot wire extending through the joint portion. The pilot wire can pass a pilot current from the body portion of the torch housing to the head portion of the torch housing. A torch can also include cap sensor switch wires extending through the joint portion.

A pivotal connector can include an elbow joint directing the processing gas in a perpendicular direction from the common axis (e.g., a common axis of an pivotal connector and a joint portion of the torch housing).

A torch can also include a rotational joint of the torch housing and a rotatable connector configured to rotate the head portion of the torch housing, joint portion of the torch housing and the pivotal connector relative to the body portion of the torch housing.

In some embodiments, a gas seal can include an o-ring. A gas seal can also include complementary sealing, manufactured, or formed surfaces.

In some embodiments, a connector conducting an electrical current and providing a processing gas between the body portion and the head portion of the torch can be independent from and disposed relative to a pivotal joint.

A first electrically conductive gas tube can be an electrically conductive male connector. In some embodiments, a second electrically conductive gas tube can be an electrically conductive female connector. In some embodiments, the resilient electrical connector is a Louvertac electrical connector disposed between the first electrically conductive gas tube and the second electrically conductive gas tube.

A torch can also include a second connector independent to and disposed relative to the pivotal joint of the torch housing. The second connector can conduct a second electrical current and can provide a second processing gas between the body portion and the head portion of the torch. In some embodiments, the electrical current or the second electrical current is a pilot current or a cutting current.

In some embodiments, a torch includes a pilot wire passing a pilot current between the body portion and the head portion. The torch can also include cap sensor switch wires extending between the body portion and the head portion.

In some embodiments, the connector includes an elbow joint directing the processing gas in a perpendicular direction from a longitudinal axis of the body portion of the torch. A torch can also include a rotational joint of the torch housing and a rotatable connector configured to rotate the head portion and the connector relative to the body portion of the torch.

In some embodiments, an articulating thermal processing torch includes a pivotal joint and a rotational joint, where the rotational joint is separate and independent to the pivotal joint. A pivotal joint can be configured to pivot the head portion relative to the body portion up to about 180 degrees. In some embodiments, the rotational joint is configured to rotate the head portion and the pivotal joint relative to at least a portion of the body portion up to about 360 degrees.

In some embodiments, a pivotal joint includes a pivotal connector. The pivotal connector can simultaneously pivot about a common axis with the pivotal joint of the torch. The pivotal connector can include an electrically conductive wall conducting an electrical current between the body portion and the head portion and a passage provides a processing gas between the body portion and the head portion of the torch. In some embodiments, the electrically conductive wall defines the passage providing the processing gas.

In some embodiments, a pivotal connector pivots a torch head about a second axis substantially perpendicular to a central longitudinal axis of a torch body. A torch head can be configured to continuously rotate (e.g., rotate without stopping) independently of at least one gas lead and at least one electrical lead about a central longitudinal axis of the torch body. In some embodiments, the torch head is mounted on a torch sleeve, the torch sleeve configured to rotate about the central longitudinal axis and pivot the torch head about a second axis substantially perpendicular to the central longitudinal axis. In some embodiments, at least one electrical motor (e.g., which can include actuators and gears) pivots and rotates the torch head.

Other aspects and advantages of the invention can become apparent from the following drawings and description, all of which illustrate the principles of the invention, by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 4B shows a perspective view of the female connector of FIG. 4A engaged with the male connector of FIG. 4A.

FIG. 5 shows an exemplary pivotal connector and rotatable connector for a thermal processing torch.

FIG. 12 shows a perspective view of an exemplary mechanized bevel having two pivotal joints in a pivoted configuration.

FIG. 13A shows a left side view of an exemplary mechanized bevel having two pivotal joints that are each offset from a longitudinal axis of the torch.

FIG. 13B is a front view of the mechanized bevel of FIG. 13A.

FIG. 13C is a right side view of the mechanized bevel of FIG. 13A.

DETAILED DESCRIPTION OF THE INVENTION

Figure 1:
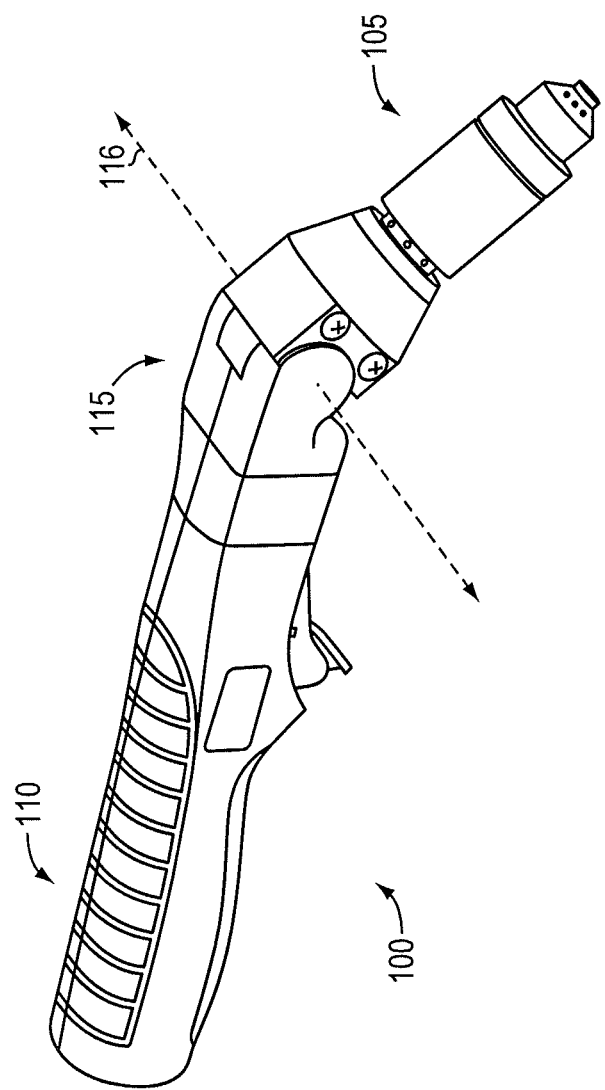
FIG. 1 shows a perspective view of an exemplary thermal processing torch.

FIG. 1 shows a perspective view of an articulating thermal processing torch 100 (e.g., welding or plasma arc torch), according to an illustrative embodiment. The thermal processing torch 100 can include a torch housing (e.g., external torch housing) having a head portion 105 pivotally coupled or pivotally attached relative to a body portion 110 with a joint portion 115. The torch 100 can also include a pivotal connector (not shown) that simultaneously pivots about a common axis 116 with the joint portion 115 of the external torch housing.

In some embodiments, a torch 100 includes a pilot wire passing a pilot current between the body portion 110 and the head portion 105. The torch 100 can also include cap sensor switch wires extending between the body portion 110 and the head portion 105. At least one pilot wire, cap sensor wire, or any combination thereof, can extend through the joint portion 115 of the torch 100.

Figure 2A:
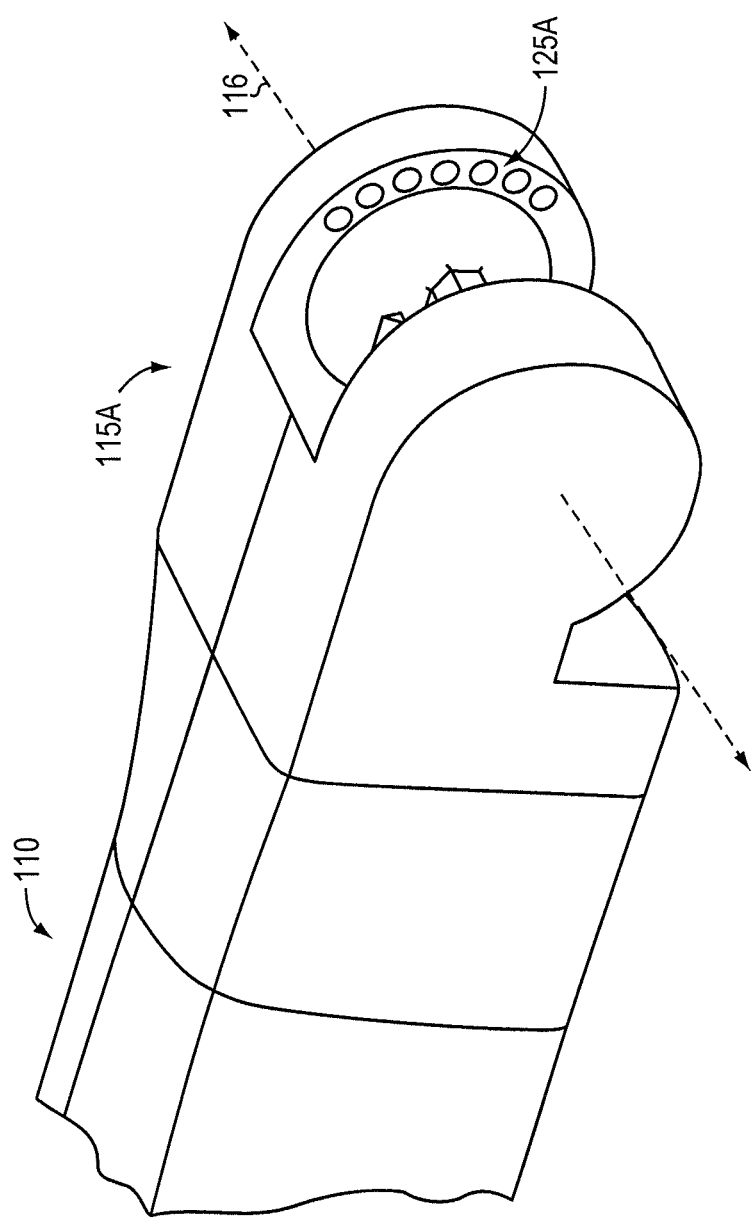
FIG. 2A shows a partial perspective view of an exemplary joint of a housing for a thermal processing torch.
Figure 2B:
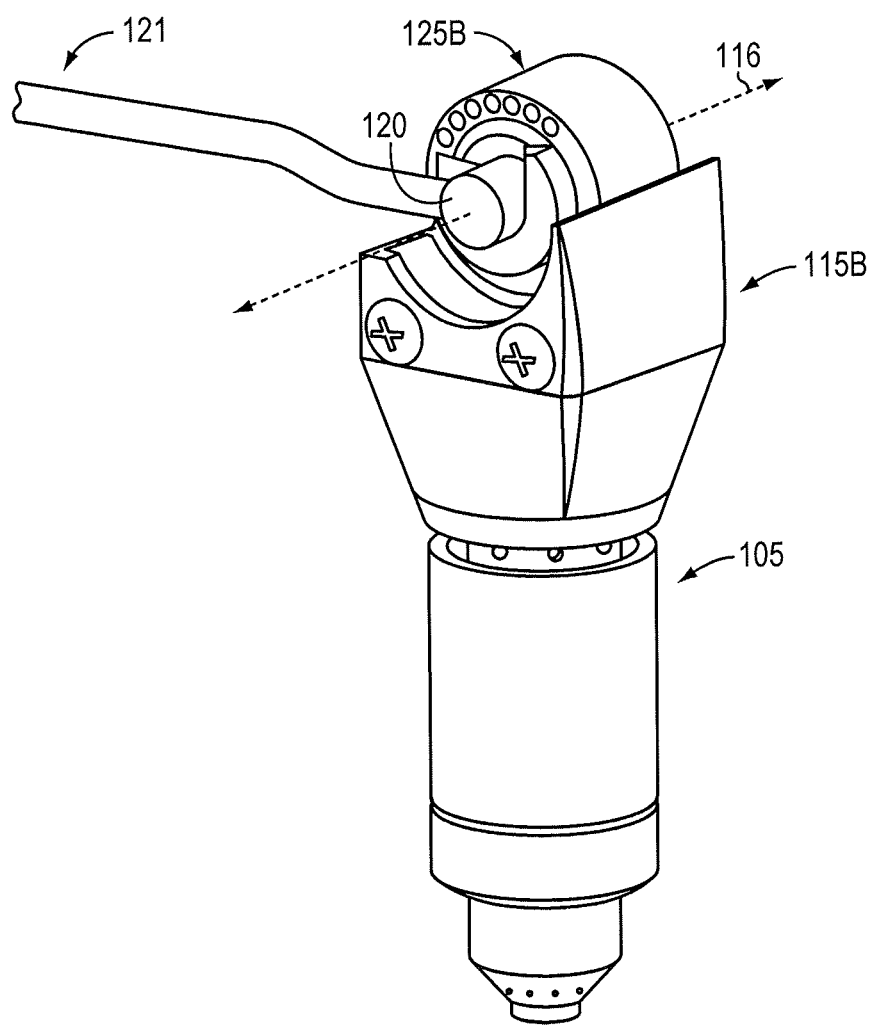
FIG. 2B shows an alternative partial perspective view of an exemplary joint of a housing for a thermal processing torch.

FIG. 2A shows a mating portion 115A of the joint portion 115 of an external torch housing for a thermal processing torch (e.g., the thermal processing torch 100). FIG. 2B shows a corresponding mating portion 115B and an internal pivotal connector 120 (e.g., pivotal connector). The mating portions 115A and 115B can include features 125A and 125B that allow the head portion 105 of the external torch housing to pivot relative to the body portion 110 of the external torch housing. In some embodiments, features 125A and 125B allow mating portions 115A and 115B to rotate with respect to one another about a common axis 116, thereby permitting the torch head portion 105 to pivot relative to the body portion 110 of the torch. In some embodiments, the joint portion 115 can be configured to pivot the head portion 105 up to about 180 degrees.

The joint portion 115 can be configured (e.g., molded, manufactured, etc.) to house the internal pivotal connector 120. The body portion 110, joint portion 115 and head portion 105 of the external torch housing can be configured (e.g., molded, manufactured, etc.) to house the internal pivotal connector 120. The external torch housing can be configured (e.g., molded, manufactured, etc.) to house an internal gas conduit 121 (e.g., tubes) in fluid communication with the internal connector 120 or wires (not shown) that can carry an electrical current between the body and the head of the torch 100. In some embodiments, the joint portion 115 has a detent to set the head portion of the external torch housing at a predetermined position.

Figure 3:
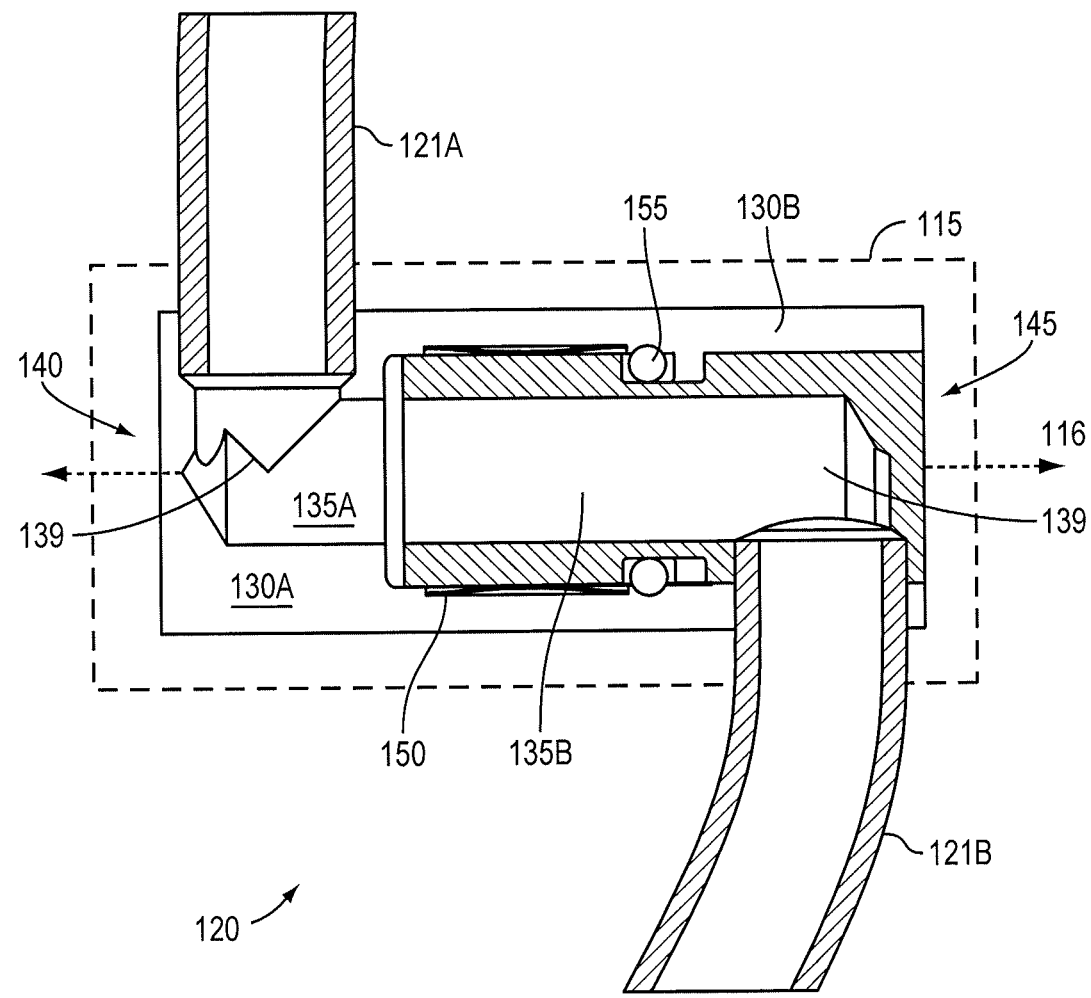
FIG. 3 shows a cut-away view of an exemplary pivotal connector for a thermal processing torch.

A thermal processing torch can include a torch housing that includes a pivotal joint. The torch can include an internal connector 120 (e.g., connector) independent of and disposed relative to a joint portion 115 (e.g., pivotal joint or joint) of the torch housing. The connector 120 can be disposed in a spatial relationship with the joint portion 115 (e.g., pivotal joint). FIG. 3 shows an internal pivotal connector 120 (e.g., pivotal connector), according to an illustrative embodiment. The internal connector 120 (e.g., internal pivotal connector 120) can conduct an electrical current and provide a processing gas, e.g., between the body portion and the head portion of the torch, while simultaneously allowing rotation about axis 116. The internal connector 120 can include an electrically conductive wall (e.g., defined by elements 130A and 130B), defining a passage (e.g., defined by elements 135A and 135B) for a processing gas or liquid. The electrically conductive wall (e.g., defined by elements 130A and 130B) can conduct an electrical current between the body portion (e.g., 110 of FIG. 1) of the external torch housing and the head portion (e.g., 105 of FIG. 1) of the external torch housing. The passage (e.g., defined by elements 135A and 135B) can provide a fluid (e.g., processing gas, liquid, etc.) between the body portion (e.g., 110 of FIG. 1) of the external torch housing and the head portion (e.g., 105 of FIG. 1) of the external torch housing. In this embodiment, a gas conduit 121 (e.g., tube) is in fluid communication with the passage 135A and 135B of the internal pivotal connector 120. The internal connector 120 can include an elbow joint 139 directing a processing gas or liquid in a perpendicular direction from the common axis 116 (e.g., a common axis 116 of an internal pivotal connector 120 and a joint portion 115 of the external torch housing). The elbow joint 139 can also direct the processing gas or liquid in a perpendicular direction from a longitudinal axis of the body portion or head portion of the torch.

In some embodiments, the electrically conductive wall that defines a passage for a processing gas or liquid for a thermal processing torch is formed by a first electrically conductive gas tube 140 engaged with a mating second electrically conductive gas tube 145. The first electrically conductive gas tube 140 can be an electrically conductive female connector. In some embodiments, a second electrically conductive gas tube 145 can be an electrically conductive male connector. The first electrically conductive gas tube 140 can include the electrically conductive wall 130A (e.g., a substantially cylindrical conductive hollow body), the internal conduit 121A (e.g., gas tube) or any combination thereof. The second, mating electrically conductive gas tube 145 can include a second electrically conductive wall 135B (e.g., a substantially cylindrical conductive hollow body) and an internal conduit 121B (e.g., gas tube) or any combination thereof. The second electrically conductive gas tube 145 can be rotationally disposed relative to the first electrically conductive gas tube 140 (e.g., about common axis 116). By configuring the first and second electrically conductive gas tubes 140 and 145 to be rotationally disposed relative to one another, the internal connector 120 can be configured to pivot a head portion of a thermal processing torch relative to a body portion of the torch. The internal connector 120 can include a resilient electrical connector 150 (e.g., Louvertac™ band available from Tyco Electronics, or a RADSOK™ connector from Amphenol (Fraser, Mich.)) electrically coupling and/or disposed between the first electrically conductive gas tube 140 to the second electrically conductive gas tube 145.

In some embodiments, a gas seal 155 can be disposed between the first electrically conductive gas tube 140 and the second electrically conductive gas tube 145. In some embodiments, instead of a first electrically conductive gas tube 140 and second electrically conductive gas tube 145, the internal pivotal connector 120 includes a first and second electrically conductive liquid tube and a seal is disposed between the first and second electrically conductive liquid tube to provide liquid isolation. In some embodiments, a seal (e.g., gas or liquid seal) can include an o-ring. As described herein, in some embodiments, a gas seal can be a liquid seal. A gas seal can also include complementary sealing, molded, manufactured, or formed surfaces, including machined or tapered surfaces.

Figure 4A:
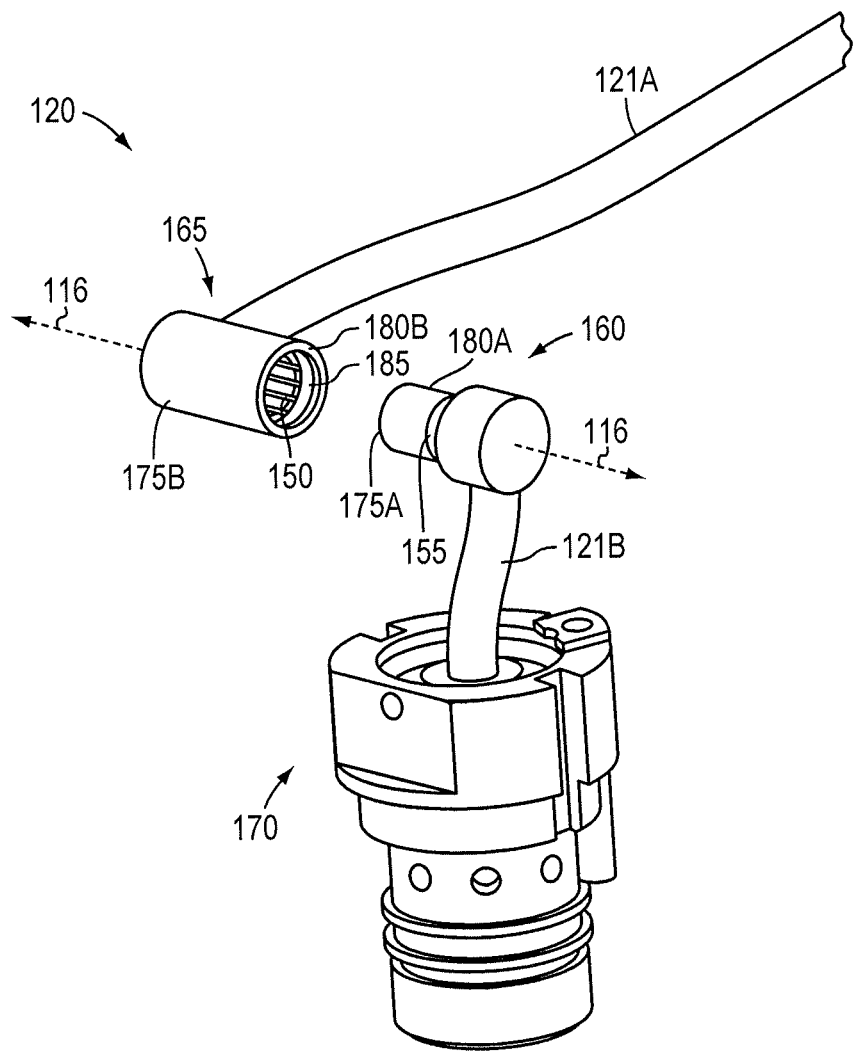
FIG. 4A shows a perspective view of an exemplary female and male connector for a thermal processing torch.

FIGS. 4A and 4B show a perspective view of an engaged and disengaged male and female connector of a pivotal connector (e.g., internal pivotal connector) for a thermal processing torch, according to an illustrative embodiment. The pivotal connector 120 assembly can include a male connector 160 and a mating female connector 165. The internal pivotal connector 120 assembly provides an electrical current and a gas flow through the engagement of the male 160 and female connector 165. The male connector 160 can be configured to rotate relative to the female connector 165 about a common axis 116, thereby permitting the torch head portion of an external housing (e.g., including torch head 170) to pivot relative to the body portion of the torch. In this embodiment, the female connector 165 is disposed relative to a body portion of the torch and the male connector 160 is disposed relative to a torch head 170. However, in other embodiments, the female connector 165 can be disposed relative to the torch head 170 and the male connector 160 can be disposed relative to the body portion of the torch (e.g., torch body).

The male connector 160 can include a tubular portion 175A that defines, at least in part, a first passage (e.g., gas passage, or passage comprised of elements 135A and 135B of FIG. 3) (not shown) and includes an electrically conductive external wall portion 180A. The mating female connector 165 can include a second tubular portion 175B that defines, at least in part, a second passage 185 (e.g., gas passage) and includes a second electrically conductive external wall portion 180B. The second passage 185 of the female connector 165 can be in fluid communication with the passage (not shown) of the male connector 160. The connector assembly 120 can also include a seal 155 (e.g., gas or liquid seal) disposed between the male connector 160 and female connector 165 providing gas isolation between a first passage (not shown) of the male connector 160 and second passage 185. The connector assembly 120 can also include a circumscribing radial spring element 150 disposed within the female connector 165 and between the first electrically conductive external wall portion 180A and second electrically conductive external wall portion 180B. The circumscribing radial spring element 150 can pass an electrical current of the torch.

In some embodiments, the male connector 160 is an electrically conductive male connector and the tubular portion 175A includes a substantially cylindrical body. A corresponding electrically conductive female connector 165 can include a second tubular portion 175B that includes a second substantially cylindrical body adapted to mate with the substantially cylindrical body of the electrically conductive male connector 160. The internal pivotal connector 120 can include a circumscribing radial spring element 150 (e.g., Louvertac™ band or a RADSOK™ connector from Amphenol) disposed between the substantially cylindrical body of the male connector and the second substantially cylindrical body of the female connector.

In some embodiments, first passage (not shown) of the male connector 160 and second passage 185 of the female connector 165 are gas passages that carry a processing gas of the plasma arc torch. In some embodiments, first passage (not shown) of the male connector 160 and second passage 185 of the female connector carry liquids and seal 155 provides liquid isolation therebetween.

FIG. 5 shows an internal pivotal connector 120' (e.g., pivotal connector) and an internal rotatable connector 190 (e.g., rotatable connector) for a thermal processing torch, according to an illustrative embodiment of the invention. The internal rotatable connector 190 can be separate and independent to the internal pivotal connector 120'. An articulating thermal processing torch can include a pivotal joint (e.g., joint portion 115 of FIG. 1) providing fluid and electrical communication between the head portion 105' and the body portion 110' of the torch. In some embodiments, a pivotal joint includes an internal pivotal connector 120'. The internal pivotal connector 120' can simultaneously pivot about a common axis with the pivotal joint of the torch. The internal pivotal connector 120' can include an electrically conductive wall defining a passage for a processing gas. In some embodiments, the electrically conductive wall conducts an electrical current between the body portion 110' and the head portion 105' and the passage provides a processing gas between the body portion 110' and the head portion 105' of the torch. The pivotal joint can enable the head portion 105' to pivot relative to the body portion 110' (e.g., enables the head portion 105' to pivot in an arc relative to the body portion 110'). A pivotal joint can be configured to pivot the head portion 105' relative to the body portion 110' up to about 180 degrees.

The torch can include a rotational joint (e.g., a rotational joint disposed relative to the external torch housing (not shown) or an internal rotatable connector 190) that can provide fluid and electrical communication through the body portion 110'. An independent rotational joint can allow the articulating head to rotate or "swing" relative to the body portion 110' (e.g., torch body). In such an embodiment, the same type of connector can be used in the internal pivotal connector (e.g., internal pivotal connector 120 or 120') except that the internal conduits (e.g., conduits 121A and 121B which can include gas tubes) connects to the joint at opposite ends and in axial alignment (e.g., along axis 195). As one skilled in the art will recognize, the ability to simultaneously pivot and rotate the head of a torch allows beveling operations to be performed, but in this embodiment, minimal movement of the torch is required. The ability to simultaneously pivot and rotate the head of a torch also can allow greater access during use and maintenance of a torch. The rotational joint can be configured to rotate the head portion 105' of an external torch housing and the pivotal joint (e.g., joint portion 115 of FIG. 1) about an axis 195 of the body portion 110' of the external torch housing. In some embodiments, the rotational joint is configured to rotate the head portion 105' and the pivotal joint relative to at least a portion of the body portion 110' up to about 360 degrees. In some embodiments, a rotational joint (e.g., a rotational joint disposed relative to the external torch housing (not shown) or an internal rotatable connector 190) includes a detent to set the head portion 105' of the external torch housing and the joint portion (not shown) of the external torch housing at a predetermined position relative to the body portion 110'.

Figure 6:
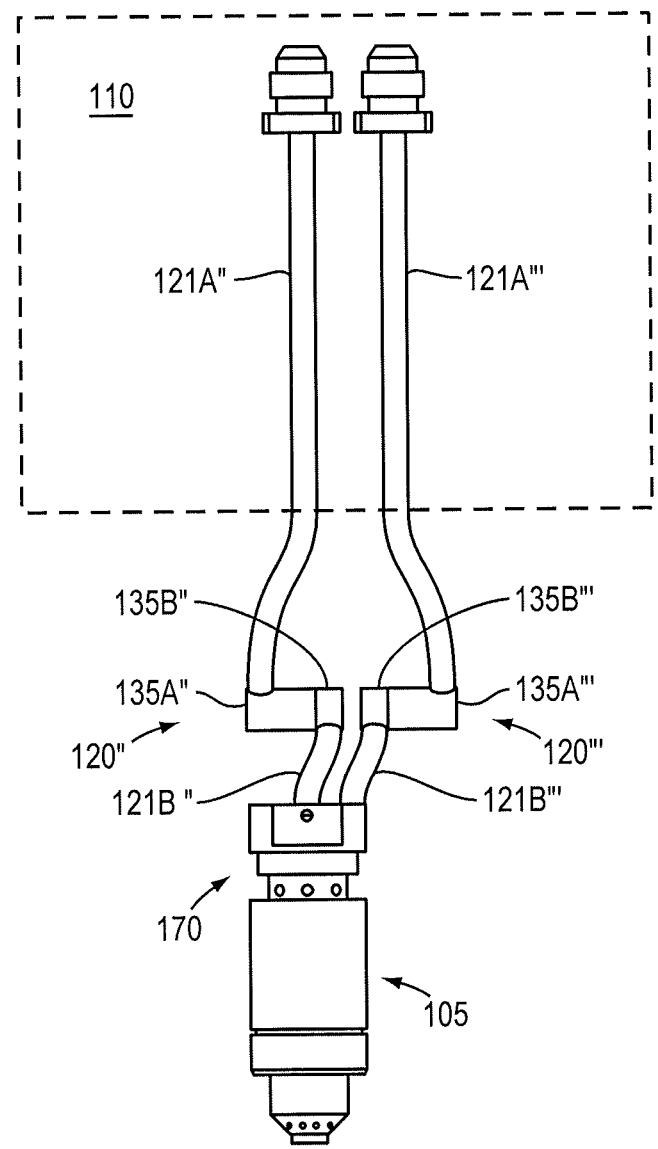
FIG. 6 shows two exemplary pivotal connectors in parallel for a thermal processing torch.

In some embodiments, a torch can include a plurality of internal pivot connectors to carry a plurality of gases and electrical currents from a body portion of a torch to a head portion of the torch. In some embodiments, a torch housing can include a plurality of passages that are adapted to carry a current and/or gas. FIG. 6 shows two internal pivotal connectors (e.g., two pivotal connectors) disposed relative to one another, according to an illustrative embodiment of the invention. In some embodiments, a torch can include an internal pivotal connector (e.g., a first internal pivotal connector) 120" disposed relative to (e.g., in parallel with) a second internal pivotal connector 120'''. Both internal pivotal connectors 120" and 120''' can be independent to and disposed relative to a joint portion (e.g., joint portion 115 of FIG. 1 or pivot joint) of the torch housing. In some embodiments, the pivotal connectors 120" and 120''' are disposed in a spatial relationship with a joint portion of the torch housing. The first and second internal pivotal connectors 120" and 120''' can conduct a first and second electrical current, respectively. The first and second internal pivotal connectors 120" and 120''' can carry a first and second processing gas or liquid, respectively.

The first internal pivotal connector 120" can be in fluid communication with an internal conduit 121A" (e.g., passage) that can carry a first gas or liquid and can be electrically conductive to carry a first electrical current. The second internal pivotal connector 120''' can be in fluid communication with an internal conduit 121A''' (e.g., passage) that can carry a second gas or liquid and can be electrically conductive to carry a second electrical current.

The first internal pivotal connector 120" can include an electrically conductive wall (e.g., formed by elements 135A" and 135B") defining a passage (not shown) for a processing gas or liquid. The electrically conductive wall (e.g., formed by elements 135A" and 135B") can conduct an electrical current between the body portion 110 of the external torch housing and the head portion 105 of the external torch housing. The passage can provide a processing gas or liquid between the body portion 110 of the external torch housing and the head portion 105 of the external torch housing. The second internal pivotal connector 120' can include a second electrically conductive wall (e.g., formed by elements 135A' and 135B''') defining a second passage (not shown) for a processing gas or liquid. The second electrically conductive wall (e.g., formed by elements 135A' and 135B''') can conduct a second electrical current between the body portion 110 of the external torch housing and the head portion 105 of the external torch housing. The second passage can provide a second processing gas or liquid between the body portion 110 of the external torch housing and the head portion 105 of the external torch housing. In some embodiments, a first internal pivotal connector 120" and second internal pivotal connector 120' can conduct at least one of a pilot current or a cutting current, at least one of a cutting gas or shield gas or any combination thereof.

Figure 7:
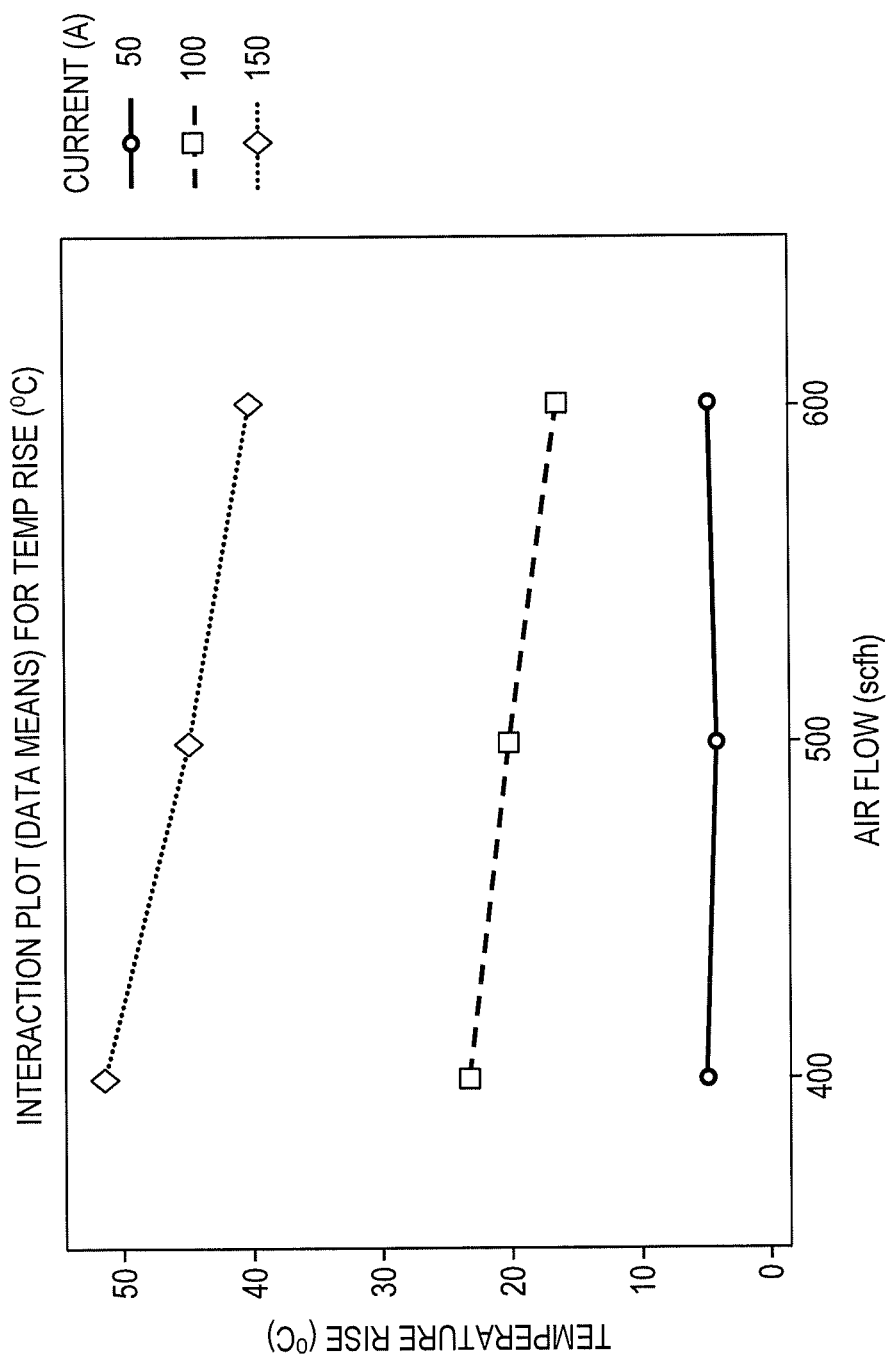
FIG. 7 shows the heat rise results for an exemplary articulating joint.

FIG. 7 shows the results of thermal heat rise tests with various electrical loads and air flow through the joint to demonstrate its viability. Specifically, the graph in FIG. 7 shows the temperature rise of a joint based on the air flow and operating current. A pivotal connector (e.g., similar to internal pivotal connector 120 and 120' described above) was used for testing. For a heat rise criteria of less than 30° C., the results of the testing show a wide operating range, particularly for operating currents of 100 Amps. The graph shows how the gas (e.g., or in some embodiments, a liquid) flowing through a connector (e.g., an internal pivotal connector or internal rotatable connector) can also act to cool the connector, particularly as the gas flow increases. An advantage of this design is that the gas can cool an inside of the electrical connector.

Figure 8:
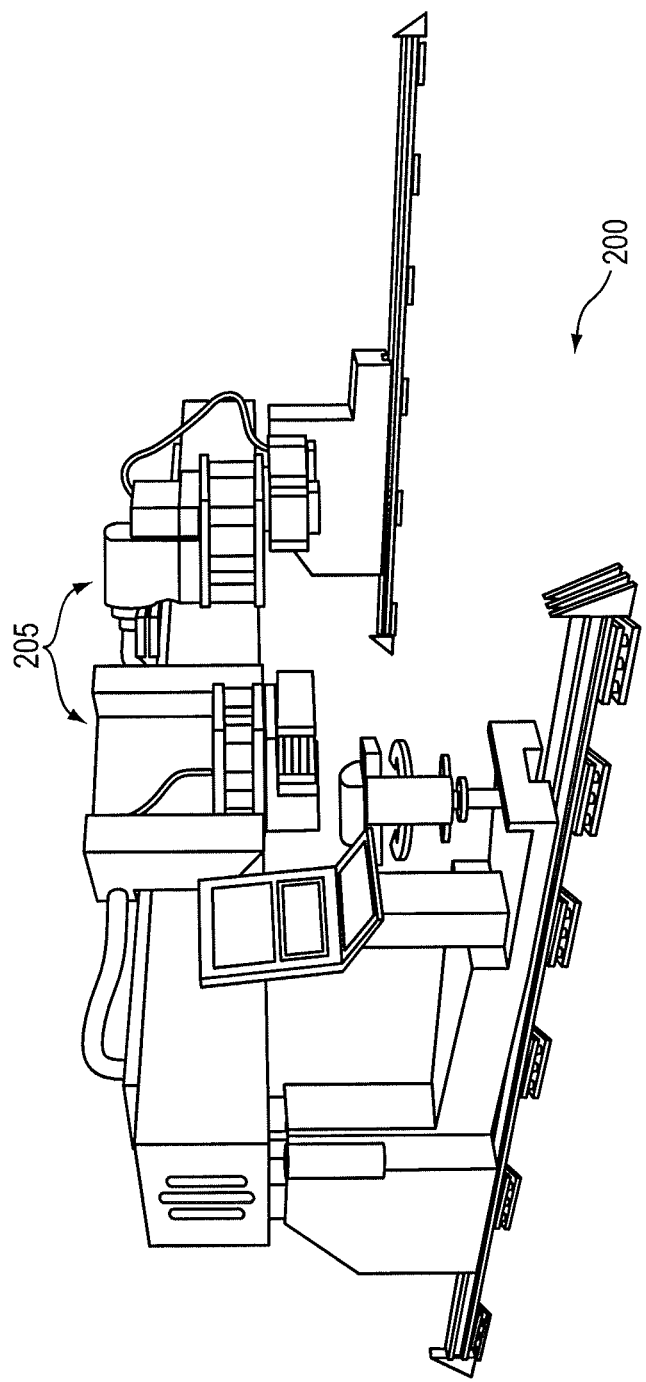
FIG. 8 shows a prior art gantry used for bevel cutting.

FIG. 8 shows an automated system 200 used with a plasma arc torch. The current state of the technology requires that when using a plasma arc torch or other similar cutting torch, large motors 205 are used to move the static torch body and head to perform the cut. Several such motors are required for each torch head as movement of the torch head about several different axes is required, often simultaneously. As a result such systems are very large, imprecise, trouble-prone, and expensive and by moving the torch body and head, can impose mechanical stress and strains on the leads extending from the torch body.

Figures 9A, 9B:
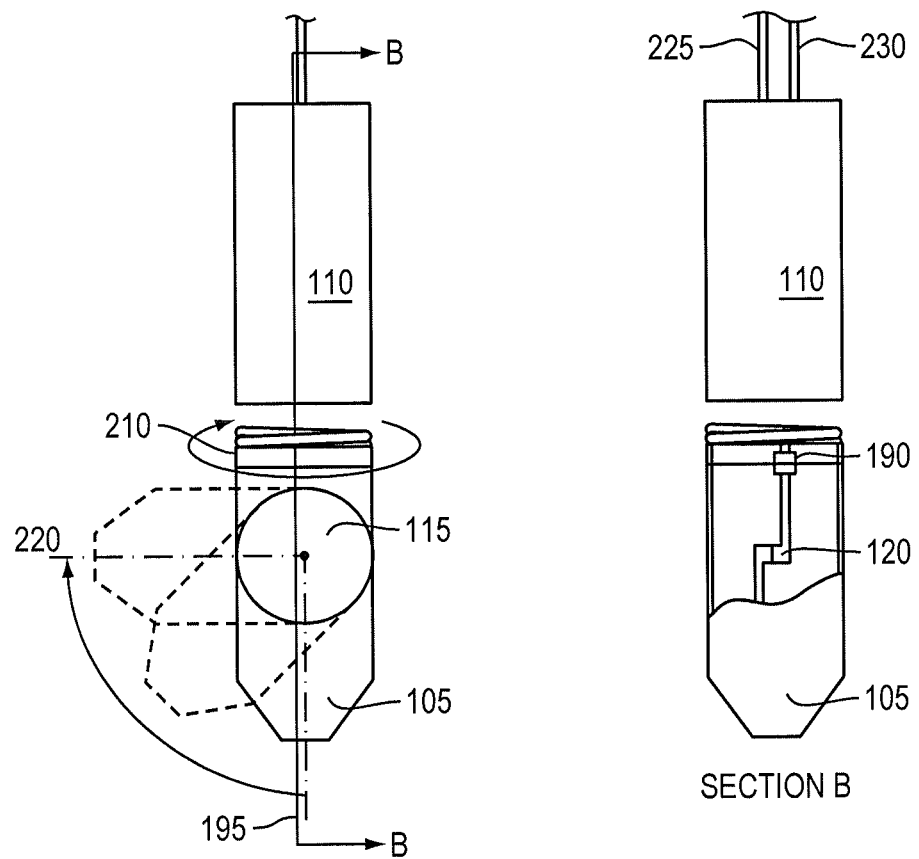
FIG. 9A shows an exemplary pivotal and rotational joint of an external housing for a mechanized bevel.
FIG. 9B shows the pivotal connector and rotational connector for the mechanized bevel of FIG. 9A.

FIGS. 9A and 9B show the pivotal and rotational capability that can be used to perform a bevel cut, according to an illustrative embodiment of the invention. A thermal processing torch, such as a plasma arc torch, can include a joint portion 115 and a rotational joint 210 disposed relative to a head portion 105 of an external housing of the torch. Joint portion 115 can include an internal pivotal connector 120 and rotational joint 210 can include internal rotatable connector 190, allowing both pivotal and rotational movement.

Figures 10A, 10B:
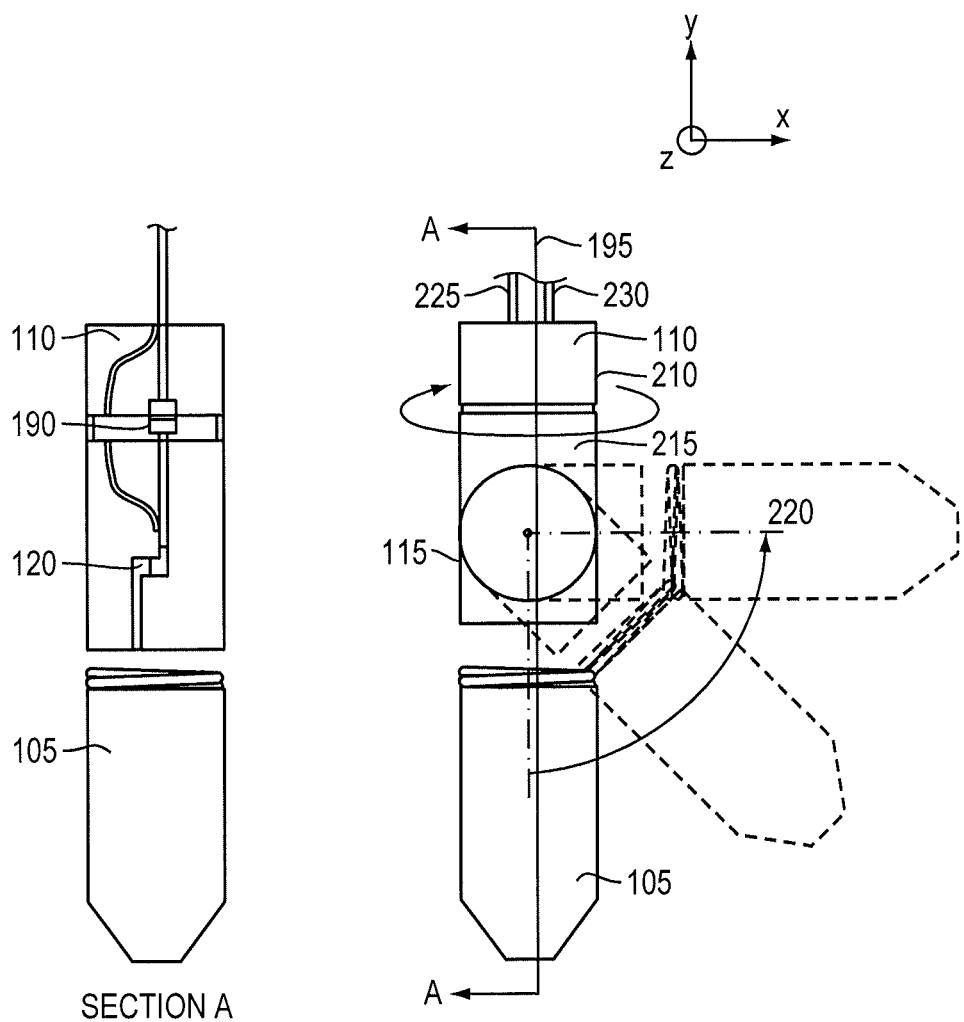
FIG. 10A shows an exemplary pivotal and rotational joint of an external housing for a mechanized bevel.
FIG. 10B shows the internal electrical connection for the mechanized bevel of FIG. 10A.

FIGS. 10A and 10B show the pivotal and rotational capability that can be used to perform a bevel cut, according to an alternative illustrative embodiment of the invention. In this embodiment, the joint portion 115 and rotational joint 210 are disposed relative to the torch body, permitting at least a portion of the torch body 215 and head portion 105 to be pivoted and rotated. The ability to simultaneously pivot and rotate the head of a torch allows beveling operations to be performed, but in this embodiment, minimal movement of the torch is required and large expensive motors do not need to be used to move the entire torch. In this embodiment, the joint portion 115 and rotational joint 210 are disposed relative to the torch head 105, permitting only the head portion 105, rather than the entire torch, to be pivoted and rotated.

Figures 11A, 11B:
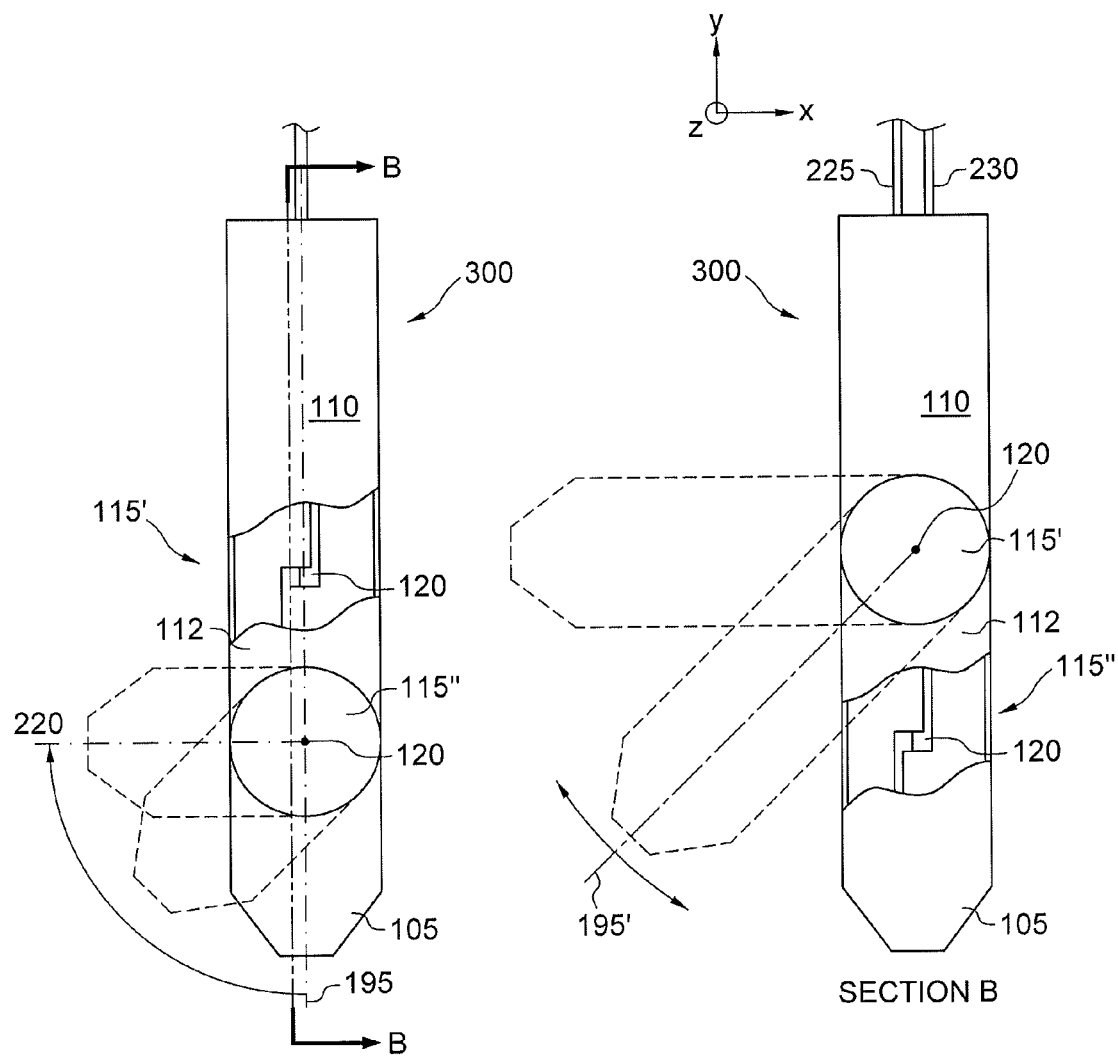
FIG. 11A shows a front view of an exemplary mechanized bevel having two pivotal joints.
FIG. 11B shows a side view of the mechanized bevel of FIG. 11A.

FIGS. 11A and 11B illustrate an exemplary torch that can include two pivotal connectors. For example, a thermal processing torch (e.g., a plasma arc torch) 300 can include a first, end portion 110 coupled to a middle portion 112 by a first joint 115' and a torch head portion 105 coupled to the middle portion 112 by a second joint 115". The end portion 110, middle portion 112, and/or the head portion 105 are typically formed of rigid members, such as frame structures or molded housings, which can house any of various elements or components to deliver gas or electricity to the torch head. For example, the first joint 115' and the second joint 115" can each house a pivotal connector (e.g., the pivotal connectors 120 as discussed above). The end portion 110 is typically configured to be connected to or integrated within a torch mount region, which can include a torch mount of a gantry or a handle portion of a handheld torch. In some embodiments, the torch mount region can be positioned above the end portion (e.g., at an end opposite the first joint 115') to grasp and move the torch along an x-y plane defined by the workpiece to be cut. The torch can be connected to a torch lead line (e.g., a flexible torch lead line) that houses a conductive current carrying member a gas conduit to provide electricity and processing gas to the torch.

The first and second joints 115', 115" (and the pivotal connectors which can be contained therein) can be disposed at an offset angle relative to one another about a longitudinal axis, such as a torch body longitudinal axis 195 or a torch head portion longitudinal axis 195'. As a result of the offset angle, the first and second joints can typically pivot along planes that are offset from one another. Using multiple pivotal connectors at different angles relative to one another about the longitudinal axis can permit in the head portion to be moved to any of various positions and angular orientations relative to other portions of the torch, such as the end portion 110 (e.g., a handle or a portion mounted to a gantry) or to the workpiece. Additionally, multiple pivotal connectors can allow for smoothly moving (e.g., in a sweeping motion) the torch head throughout various positions. As illustrated, the two joints (e.g., and the two pivotal connectors) can be positioned generally perpendicularly about the longitudinal axis relative to one another so that the torch head portion 105 can have a full range of motion with respect to the end portion 110. That is, in some cases, a pivoting axis of the first pivotal connector can be arranged substantially perpendicular (e.g., within about 70 degrees to about 90 degrees (e.g., about 85 degrees to about 90 degrees)) to a pivoting axis of the second pivotal connector. For example, FIG. 12 illustrates the pivot joints each being pivoted by an angle (e.g., $\Phi 1$, $\Phi 2$) so that a longitudinal axis of the torch head 195' can be positioned relative to the torch body longitudinal axis 195.

While the examples shown include two pivotal connectors positioned substantially perpendicularly relative to one another, other configurations are possible. For example, in some embodiments, the torch can include more than two pivotal connectors disposed between the torch body and the torch head portion. Additionally or alternatively, the torch can include pivotal connectors that are disposed at angles other than perpendicular angles relative to one another. Unless otherwise explicitly illustrated or described, the first and second pivotal connectors can be formed and constructed similarly (e.g., or the same) as the pivotal connectors described above in accordance with the other figures of this application, for example, the internal pivotal connector 120 as described above with respect to FIG. 3. As discussed above, one or more of the first and second pivotal connectors can be packaged and disposed with in a joint portion 115', 115" to contain and protect the pivotal connectors. In some embodiments, one or more of the pivotal connectors 120' can simultaneously pivot about a common axis with the respective joint portions 115', 115" in which they are arranged.

In some cases, a torch can be configured so that at least one of the pivot joints can be positioned offset from the torch body longitudinal axis 195 when the torch head is arranged perpendicularly relative to a workpiece to be processed. For example, referring the FIGS. 13A-13C, in some embodiments, a torch 400 can include one or more pivot joints that can be offset at an angle away from the torch body longitudinal axis when the torch body is perpendicular to the workpiece surface 50 to be cut. That is, in some embodiments, the end portion 110 and the middle portion 112 can be arranged at a non-zero angle (e.g., $\Phi 3$) relative to one another. Similarly, the middle portion 112 and the head portion 105 can be arranged at a non-zero angle (e.g., $\Phi 4$) relative to one another. For example, the offset angles $\Phi 3$ or $\Phi 4$ can be about 0 degrees to about 30 degrees (e.g., about 5 degrees to about 20 degrees or about 5 degrees to about 15 degrees).

Such a configuration can help make the pivotal joint easier to operate, for example, easier to move from a position perpendicular from the surface 50 to be cut. That is, in some embodiments, the pivotal joints can be operated using actuators (e.g., electric, pneumatic, mechanical, or hydraulic actuators, including liner type actuators) 114. In the example illustrated in FIGS. 13A-13C, actuator 114' is coupled between the end portion 110 and the middle portion 112 to pivot the first joint 115' and actuator 114" is coupled between the middle portion 112 and the head portion 105 to pivot the second joint 115". In some cases, actuators can require more force to move a joint from a zero angle (i.e., collinear with the torch body longitudinal axis) than a joint that is already pivoted a small offset angle, such as when using a liner actuator. In particular, linear actuators that need to move a joint from a zero degree angle effectively use a longitudinal force to move the joint transverse to the longitudinal direction, which can require additional force and take longer time. Therefore, by offsetting the pivot joints by offset angles, less force can be used to actuate the joint. Additionally, in some cases, the joints can be pivoted faster when offset.

Additionally or alternatively, in some embodiments, one or more pivotal connectors within a pivot joint (e.g., the first conduit 121A and the second conduit 121B) can be arranged at an offset angle that is about 0 degrees to about 30 degrees away from one another when the torch head portion 105 is perpendicular to the workpiece 50. In some embodiments, the pivotal connectors can be offset while the torch housing portions (e.g., the end portion and the middle portion) are substantially in line with one another. In such embodiments, actuators can be coupled directly to the pivotal connector rather than being arranged externally and coupled to the housing.

Figure 14:
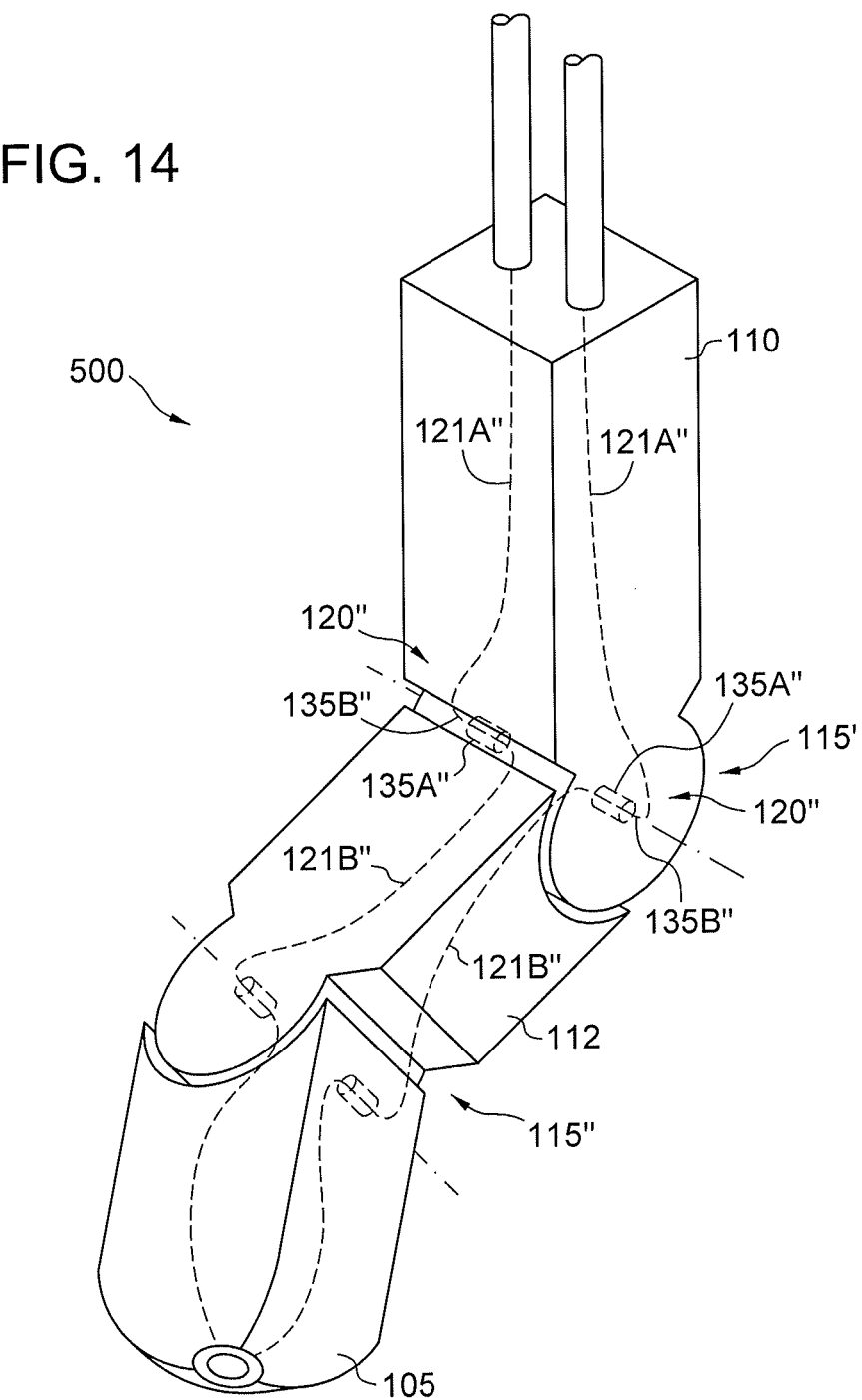
FIG. 14 is a perspective view of a mechanized bevel that includes two sets of two pivotal joints to deliver multiple fluids to a torch head.

While the example torches having two pivotal connectors have generally been described and illustrated as having pivotal connectors defining only one conduit fluid path (e.g., only one processing gas or fluid passage), other configurations are possible. For example, in some embodiments, referring to FIG. 14, a torch 500 can include two sets of conduits and pivotal connectors to provide two fluids to the torch head. For example, the torch having two pivotal connects can include pivotal connectors 120" as described above and illustrated in FIG. 6. For simplicity, the two sets of pivotal connectors 120" within the torch are illustrated schematically. As illustrated, in some embodiments, each of the sets of pivotal connectors can include pivotal connectors arranged in-line with one another so that two pivotal connectors can pivot about a common axis. In some cases, the joint portions (e.g., joint portions 115', 115") can each house two pivotal connectors arranged collinearly with one another.

A method for creating a bevel cut with a torch can include pivoting a head portion 105 of the torch relative to a torch body (e.g., body portion 110). The torch body can be mounted in a stationary position on and relative to a gantry (not shown). In some embodiments, the torch body is rigidly affixed to a gantry. The method can also include rotating the pivoted head portion 105 about a longitudinal axis 195 of the torch body 110 to position the torch head (e.g., head portion 105) relative to a workpiece. In some embodiments, the method can alternatively or additionally include pivoting the head portion 105 a first angle relative to a torch body 110 using a first pivotal connector 120 and pivoting the head portion 105 a second angle relative to the torch body using a second pivotal connector 120.

In some embodiments, the torch can have motorized rotational and/or pivotal capabilities. The torch can include a torch body (e.g., body portion 110), a head portion 105 and one or more motorized pivot joints (e.g., motorized joint having a pivotal capability of joint portion 115) configured to pivot the head portion 105 relative to the body (e.g., body portion 110). As discussed above, in some cases, the torch can include two pivot joints positioned at an angle (e.g., about 90 degrees) relative to one another about the torch's longitudinal axis. The motorized pivot joints can be mechanically coupled to at least one of the torch body or head portion to enable the head portion to pivot relative to the body. The torch can also include a motorized rotational joint (e.g., motorized joint having a rotational capability of rotational joint 210) configured to rotate the head portion 105 and the motorized pivot joint relative to at least a portion of the body and position the torch head relative to a workpiece. The motorized rotational joint can be mechanically coupled to at least one of the torch body or head portion to enable the head portion to rotate relative to at least a portion of the body for positioning the torch head relative to a workpiece.

In some embodiments, a beveling torch system that can include a torch body 110 having a central longitudinal axis 195 and a torch head (e.g., head portion 105) having a central longitudinal axis 220. The torch head can be connected to the torch head. Depending on the pivotal location of the torch head, the central longitudinal axis 220 of the torch head can be aligned with the longitudinal axis 195 of the body portion 110. If the torch head is pivoted at an angle, then the central longitudinal axis 220 of the head is disposed at an angle relative to the longitudinal axis 195 of the body portion 110. The beveling system can include at least one gas lead 225 extending into the torch head and at least one electrical lead 230 extending into the torch head. The system can also include a rotatable connector 190 (e.g., internal rotatable connector) rotating the torch head independently of the at least one gas lead 225 and the at least one electrical lead 230 about the central longitudinal axis 195 of the torch body. The system can include an internal pivotal connector 120 that can include an electrically conductive wall (e.g., wall comprised of 130A and 130B as described above in FIG. 3) defining a passage (e.g., passed comprised of 135A and 135B as described above in FIG. 3) for a processing gas. The electrically conductive wall can conduct an electrical current and the passage can provide a processing gas. The internal pivotal connector 120 can pivot the torch head relative to second axis (e.g., the z-axis) disposed at an angle relative to the central longitudinal axis 195 of the body of the torch. In some embodiments, the second axis is substantially perpendicular to the central longitudinal axis 195 of the torch body.

The torch head (e.g., head portion 105) can be configured to continuously rotate (e.g., rotate without stopping) independently of at least one gas lead 225 and at least one electrical lead 230 about a central longitudinal axis 195 of the torch body. In some embodiments, the torch head is mounted on a torch sleeve (e.g., for example, a sleeve that is a portion 215 of the body portion 110) disposed relative to a body portion 110, the torch sleeve configured to rotate about the central longitudinal axis 195 and pivot the torch head about a second axis (e.g., z-axis) substantially perpendicular to the central longitudinal axis 195. In some embodiments, at least one electrical motor (e.g., which can include actuators and gears) pivots and rotates the torch head.

While the invention has been particularly shown and described with reference to specific illustrative embodiments, it should be understood that various changes in form and detail may be made without departing from the spirit and scope of the invention.

What is claimed is:

1. An actuated, gantry-mounted mechanized plasma processing torch comprising:
    a torch housing having a head portion pivotally coupled to a body portion;
    a first pivot joint located between the head portion and the body portion, the first pivot joint pivoting along a first plane;
        a first electrically conductive member conducting an electrical current across the first pivot joint;
        a first interior gas passage to convey a processing gas across the first joint;
    a second pivot joint located between the head portion and the first pivot joint, the second pivot joint pivoting along a second plane;
        a second electrically conductive member conducting an electrical current across the second pivot joint; and
        a second interior gas passage to convey a processing gas across the second pivot joint,
    wherein the first pivot joint is disposed at a substantially perpendicular angle from the second pivot joint about a longitudinal axis of the body portion such that the actuated torch is configured to pivot the first pivot joint along the first plane that is disposed at the substantially perpendicular angle from the second plane along which the second pivot joint pivots.

2. The torch of claim 1 wherein the first pivot joint has a first pivotal connector that comprises a first electrically conductive wall: i) conducting the electrical current between the body portion and the head portion; and ii) defining and surrounding at least a portion of the first interior passage fluidly to provide the processing gas between the body portion and the head portion.

3. The torch of claim 1 wherein the first interior passage and the second interior passage together provide a shield gas or a plasma gas to the head portion.

4. The torch of claim 1 wherein a pivoting axis of the first pivot joint is disposed at the substantially perpendicular angle away from a pivoting axis of the second pivot joint.

5. The torch of claim 4 wherein the substantially perpendicular angle is about 70 degrees to about 90 degrees.

6. The torch of claim 5 wherein the substantially perpendicular angle is about 85 degrees to about 90 degrees.

7. The torch of claim 1 wherein at least one of the pivotal joints is biased at an offset angle when the head portion is substantially perpendicular to a surface of a workpiece to be cut by the torch.

8. The torch of claim 7 wherein the offset angle is relative to the longitudinal axis of the body portion.

9. The torch of claim 1, wherein the first pivot joint contains a first pivotal connector, the connector comprising:
    an electrically conductive male connector comprising a substantially cylindrical body;
    an electrically conductive female connector comprising a second substantially cylindrical body adapted to mate with the electrically conductive male connector; and
    a resilient electrical connector disposed between the substantially cylindrical body of the male connector and the second substantially cylindrical body of the female connector.

10. The torch of claim 9 wherein the resilient electrical connector comprises a Louvertac band electrical connector.

11. The torch of claim 1 further comprising a first actuator driving the first pivot joint and a second actuator driving the second pivot joint.

12. An actuated, gantry-mounted mechanized plasma processing torch comprising:
- an end portion that receives at least one gas and at least one power input;
- a first joint coupled to the end portion, the first joint conveying the gas and power through the first joint, the first joint pivoting along a first plane;
- a middle portion coupled to the first joint, the middle portion conveying the gas and power through the middle portion;
- a second joint coupled to the middle portion at an end opposite the first joint, the second joint conveying the gas and power through the second joint, the second joint pivoting along a second plane; and
- a head portion coupled to the second joint, the head portion conveying the gas and power to a torch tip to generate a plasma arc,
- wherein the first joint is disposed at a substantially perpendicular angle from the second joint about a longitudinal axis of the middle portion such that the actuated torch is configured to pivot the first joint along the first plane that is disposed at the substantially perpendicular angle from the second plane along which the second joint pivots.

13. The plasma processing torch of claim 12 wherein the first joint is one of a pivot joint or a rotational joint.

14. The plasma processing torch of claim 12 wherein the first and second joints are pivot joints.

15. The plasma processing torch of claim 12 wherein the end portion, middle portion, and head portion comprise rigid members.

16. The plasma processing torch of claim 12 wherein the first joint and the second joint are offset from one another relative to a longitudinal axis of the end portion.

17. The plasma processing torch of claim 16 wherein the first joint and the second joint pivot along different planes.

18. The plasma processing torch of claim 12 further comprising a first actuator coupled between the end portion and the middle portion and a second actuator coupled between the middle portion and the head portion.

19. The plasma processing torch of claim 12 wherein at least one of the joints houses a pivotal connector comprising:
- an electrically conductive wall: i) conducting the power between the end portion and the head portion; and ii) defining and surrounding an interior passage to provide the gas between the end portion and the head portion.

20. The torch of claim 12 wherein at least one of the joints is biased at an offset angle when the head portion is substantially perpendicular to a surface of a workpiece to be cut.

21. A method of forming a bevel cut along a substantially planar workpiece with an actuated, gantry-mounted mechanized plasma arc torch, the method comprising:
- forming a beveled edge of a workpiece by:
  - pivoting a head portion of the torch about a first pivot axis by pivoting a first pivotal connector: i) conducting an electrical current between a body portion of the torch and the head portion; and ii) defining and surrounding at least a portion of a first interior passage to provide a processing gas between the body portion and the head portion, the first pivotal connector pivoting along a first plane;
  - pivoting the head portion and the first pivot axis about a second pivot axis by pivoting a second pivotal connector defining a second interior passage in fluid communication with the first interior passage to provide the processing gas between the body portion and the head portion, the second pivotal connector pivoting along a second plane and the second pivot axis being disposed at a substantially perpendicular angle from the first pivot axis about a longitudinal axis of the body portion such that the actuated torch is configured to pivot the first pivotal connector along the first plane that is disposed at the substantially perpendicular angle from the second plane along which the second pivotal connector pivots; and
  - moving the head portion along the workpiece to form a peripheral edge of the bevel cut.

22. The method of claim 21 wherein the pivoting about the first pivot axis and the pivoting about the second pivot axis are performed simultaneously.

23. The method of claim 21 wherein the moving the head portion along the workpiece comprises translating the body portion and the head portion along the workpiece while the head portion is pivoted about the first and/or second pivot axes.

24. The method of claim 21 wherein the substantially perpendicular angle between the first pivot axis and the second pivot axis about the body portion longitudinal axis is about 70 degrees to about 90 degrees.

* * * * *